United States Patent
Ishii et al.

(10) Patent No.: US 9,497,676 B2
(45) Date of Patent: *Nov. 15, 2016

(54) USER EQUIPMENT AND MEASUREMENT METHOD

(75) Inventors: Hiroyuki Ishii, Tokyo (JP); Daisuke Nishikawa, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 13/979,176

(22) PCT Filed: Jan. 11, 2012

(86) PCT No.: PCT/JP2012/050354
§ 371 (c)(1),
(2), (4) Date: Sep. 3, 2013

(87) PCT Pub. No.: WO2012/096296
PCT Pub. Date: Jul. 19, 2012

(65) Prior Publication Data
US 2013/0336148 A1 Dec. 19, 2013

(30) Foreign Application Priority Data
Jan. 11, 2011 (JP) .................. 2011-003475

(51) Int. Cl.
*H04W 36/00* (2009.01)
*H04B 17/318* (2015.01)
(Continued)

(52) U.S. Cl.
CPC ....... *H04W 36/0094* (2013.01); *H04B 17/318* (2015.01); *H04J 11/005* (2013.01);
(Continued)

(58) Field of Classification Search
CPC .............. H04W 24/10; H04W 36/0094; H04L 5/0073; H04J 11/005; H04B 17/318
See application file for complete search history.

(56) References Cited

U.S. PATENT DOCUMENTS

2009/0042559 A1  2/2009 Choi
2010/0322202 A1  12/2010 Ohta
(Continued)

FOREIGN PATENT DOCUMENTS

| CN | 101772927 A | 7/2010 |
|---|---|---|
| EP | 2239976 A1 | 10/2010 |
| WO | 2009/123163 A1 | 10/2009 |

OTHER PUBLICATIONS

English submitted version of U.S. Appl. No. 61/318,758, filed Mar. 29, 2010.*

(Continued)

*Primary Examiner* — Omer S Mian
(74) *Attorney, Agent, or Firm* — Osha Liang LLP

(57) ABSTRACT

A user equipment 10 according to the present invention is provided with a RSSI measuring unit 107 that, with regard to a predetermined sub-frame, is configured to measure a radio quality of a serving cell and a neighboring cell for all OFDM symbols within the predetermined sub-frame and that, with regard to sub-frames other than the predetermined sub-frame, is configured to measure the radio quality of the serving cell and the neighboring cell for OFDM symbols containing a reference signal within the sub-frames.

7 Claims, 10 Drawing Sheets

(51) Int. Cl.
*H04L 5/00* (2006.01)
*H04W 24/10* (2009.01)
*H04J 11/00* (2006.01)
*H04B 17/382* (2015.01)

(52) U.S. Cl.
CPC ............ *H04L 5/0073* (2013.01); *H04W 24/10* (2013.01); *H04B 17/382* (2015.01); *H04L 5/0048* (2013.01); *H04L 5/0053* (2013.01)

(56) References Cited

U.S. PATENT DOCUMENTS

2011/0286346 A1* 11/2011 Barbieri et al. ............... 370/252
2013/0033998 A1* 2/2013 Seo et al. ....................... 370/252

OTHER PUBLICATIONS

English submitted version of U.S. Appl. No. 61/379,741, filed Sep. 3, 2010.*
English submitted version of U.S. Appl. No. 61/405,215, filed Oct. 21, 2010.*
English submitted version of U.S. Appl. No. 61/446,033, filed Feb. 23, 2011.*
Office Action issued in corresponding Japanese Application No. 2012-552740, mailed Nov. 4, 2014 (5 pages).
International Search Report issued in PCT/JP2012/050354 mailed Mar. 27, 2012 (7 pages).
Ericsson; "Simulation Results for IF TDD RSRP Requirements"; 3GPP TSG-RAN WG4 Meeting #47, R4-080957; Kansas City, MO, US; May 5-9, 2008 (5 pages).
3GPP TS 36.214 V10.0.0; "3rd Generation Partnership Project; Technical Specification Group Radio Access Network; Evolved Universal Terrestrial Radio Access (E-UTRA); Physical layer; Measurements (Release 10)"; Dec. 2010 (13 pages).
NTT DOCOMO; "Definition of RSSI in e-ICIC"; 3GPP TSG-RAN WG4 meeting #58, R4-110765; Taipei, Taiwan; Feb. 21-25, 2011 (4 pages).
3GPP TSG-RAN WG4 #58, R4-110708; "[DRAFT] LS rely on RLM/RSR/RSRP measurement definitions for eICIC"; Taipei; Feb. 21-25, 2011 (2 pages).
Office Action issued in corresponding Korean Application No. 10-2013-7018797, mailed Apr. 21, 2015 (6 pages).
Ericsson; "Simulation Assumptions for RSRQ Requirements"; 3GPP TSG-RAN WG4 Meeting #47, R4-080954; Kansas City, MO; May 5-9, 2008 (5 pages).
Office Action issued in corresponding Korean Application No. 10-2013-7018797, mailed Sep. 19, 2014 (7 pages).
ZTE; "Discussion on CRS interference and CSI measurements in macro-pico deployment"; 3GPP TSG RAN WG1 Meeting #63, R1-105969; Jacksonville, United States; Nov. 15-19, 2010 (4 pages).
Alcatel-Lucent; "Specification Considerations Related to ABS for RLM and RSRP/RSRQ Measurements"; 3GPP TSG RAN WG1 #63 Meeting, R1-106396; Jacksonville, U.S.; Nov. 15-19, 2010 (3 pages).
Office Action issued in corresponding Chinese Application No. 201280005089.X dated Oct. 10, 2015, and English translation thereof (17 pages).
Office Action issued in corresponding Korean Application No. 10-2013-7018797 dated Aug. 17, 2015, and English translation thereof (7 pages).
3GPP TSG RAN WG1 Meeting #63 R1-106143 "Details of eICIC in Macro-Pico case" LG Electronics; Jacksonville, US, Nov. 15-19, 2010 (5 pages).
Extended Search Report issued in corresponding European Application No. 12734020.6, mailed Nov. 17, 2015 (8 pages).
Office Action issued in corresponding Korean Application No. 10-2013-7018797, mailed Mar. 25, 2016 (6 pages).
Written Opinion issued in corresponding international application No. PCT/JP2012/050354, mailed Mar. 27, 2012 (11 pages).

* cited by examiner

USER EQUIPMENT AND MEASUREMENT METHOD

TECHNICAL FIELD

The present invention relates to a user equipment and a measurement method.

BACKGROUND ART

In a mobile communication system including a plurality of cells, when a user equipment (UE) moves from one cell to another, the user equipment switches to the other cell to continue communications. The switching to the other cell is referred to as "handover".

Typically, when the user equipment moves to a neighboring cell from a serving cell and signal strength in the neighboring cell is higher than signal strength in the serving cell (cell in which the user equipment originally performs communications), the user equipment performs the handover to the neighboring cell.

Specifically, the user equipment performs the handover according to procedures illustrated in FIG. 1.

First, in S1, the user equipment measures signal power of the neighboring cell. Then, the user equipment confirms whether or not the signal power of the neighboring cell satisfies the following Expression 1.

Signal power of neighboring cell>Signal power of serving cell+Offset  (Expression 1)

When the Expression 1 is satisfied, the user equipment reports the event (Event A3) to the network (base station apparatus) in S2.

Note that the offset is a value provided so that the handover does not frequently occur from the serving cell to the neighboring cell at a cell boundary. The offset may be either a positive value or a negative value. Generally, the positive value is used as the offset value provided such that the handover does not frequently occur.

In S3, when the network receives the event (Event A3), the network determines that the user equipment should perform the handover to the cell for which the event (Event A3) has been reported, and then executes the handover procedures (S3).

Note that the above-described event is defined as the "Event A3", but may be defined as any other event, that is, the invent other than the "Event A3".

In LTE (Long Term Evolution) which succeeds a Wideband Code Division Multiple Access (WCDMA) or a High Speed Downlink Packet Access (HSDPA), for example, a signal power in the above-described example may be "Reference Signal Received Power (RSRP)" which is a received power of a reference signal.

The RSRP is defined in Non-Patent Literature 1. Further, the above-described LTE may be referred to as "E-UTRA/E-UTRAN". In addition, the reference signal may be a common reference signal, more specifically.

Note that, in the above-described example, the handover is performed based on the RSRP of the serving cell and the RSRP of the neighboring cell. However, a "Reference Signal Received Quality (RSRQ) may be used instead of the RSRP. Here, the RSRQ represents a value expressed as the RSRP divided by a Received Signal Strength Indicator (RSSI) and is defined in Non-Patent Literature 1. That is, the RSRQ is calculated by the following Expression 2.

RSRQ=RSRP/RSSI  (Expression 2)

The RSSI represents the sum of the received powers, that is, a total received power, of all signals such as a desired signal from the serving cell, an interference signal from the neighboring cell, a noise signal due to a thermal noise, or the like and is defined in Non-Patent Literature 1. The RSSI may be referred to as "E-UTRA carrier RSSI".

Generally, the value of the above-described RSSI differs in different frequency carriers. For example, the value of RSSI is large in the frequency carrier of high congestion degree, while the value of RSSI is small in the frequency carrier of low congestion degree. In this case, the values of RSRQ may sometimes be different by different values of RSSI due to the congestion degree or the like even though the values of RSRP are the same. Therefore, the RSRQ is used at the time of performing the handover of different frequencies, for example.

Note that the above-described RSRP or RSRQ may be used not only in the above-described "Event A3" but also in other events. In addition, "RS SIR" which is an SIR of the reference signal may be used instead of the above-described RSRP or RSRQ. Further, as a whole, the above-described RSRP, RSRQ, or RS SIR may be referred to as a wireless quality, a quality of wireless signal, or a "Radio quality".

The radio quality used in the above-described handover has a large effect on the communication quality of the mobile communication system. Particularly, measurement accuracy in S1 is related to the quality of handover.

More specifically, when the measurement accuracy is bad and the radio quality of the neighboring cell is reported worse than an original value, the handover is not performed in an area where the handover should actually be performed and the communication is disconnected.

Alternatively, when the measurement accuracy is bad and the radio quality of the neighboring cell is reported better than the original value, the handover is performed in an area where the handover should actually not be performed and the communication is disconnected.

That is, in a case where the measurement of the radio quality can be performed with good accuracy, it is possible to perform the handover appropriately, thereby preventing a failure of the handover.

The RSSI used for calculating the above-described RSRQ is measured in only the OFDM symbols containing the reference signal, as illustrated in FIG. 2.

That is, in FIG. 2, the OFDM symbols #0/#4/#7/#11 are the OFDM symbols containing the reference signal, and other OFDM symbols are the OFDM symbols not containing the reference signal.

Note that the reference signal is a reference signal of an antenna port 0, when a plurality of transmission antennas is present.

This is because, when a desired signal from the serving cell or an interference signal from the neighboring cell is not present at the time of measuring the RSSI using the OFDM symbols not containing the reference signal and a power of thermal noise is very small compared to that of the reference signal, operations in which the RSSI acting as a denominator of the RSRQ is close to "0" and the value of RSRQ diverges to infinity are prevented.

"e-ICIC (Enhanced Inter Cell Interference Coordination)" is under consideration as one technique of LTE or LTE Advanced in 3GPP, the e-ICIC technique being a technique for improving throughput by suppressing the interference from the neighboring cell. In such e-ICIC, as illustrated in FIG. 3, the user equipment performs the measurement of the above-described RSRP and RSRQ on a specific sub-frame.

In FIG. 3, the neighboring cell, which is an interfering cell, does not transmit a signal of downlink to sub-frames #2/#3/#6/#7, for example. In this case, the user equipment for performing the communication using the serving cell to be interfered performs the measurement of the RSRP and the RSRQ on only the sub-frames #2/#3/#6/#7 to which the signal of downlink is not transmitted.

Thus, the interference is present by performing the measurement of the RSRP and the RSRQ, and it is possible to perform the measurement of the RSRP and the RSRQ in which the influence of interference is excluded at the time of performing interference coordination by the e-ICIC.

Note that, for example, from a network by a signaling of RRC, the user equipment is notified that to which sub-frame the signal of downlink from the neighboring cell is not transmitted, that is, on which sub-frame the user equipment performs the measurement of the RSRP and the RSRQ.

CITATION LIST

Non-Patent Literature

Non-Patent Literature 1: 3GPPTS36. 214 v10.0.0, December, 2010

As described above, the measurement of RSRP and RSRQ at the time of performing an e-ICIC is performed on specific sub-frames, that is, sub-frames in which interference from a neighboring cell is not present. In addition, the specific sub-frames are notified to the user equipment from the network.

However, the above-described measurement of RSRQ has following problems.

As described above, the RSSI which is a denominator at the time of calculating the RSRQ is measured in only OFDM symbols containing a reference signal, as illustrated in FIG. 2.

Accordingly, when a timing of a serving cell coincides with that of a neighboring cell, the above-described value of RSSI certainly contains a power of the reference signal of the neighboring cell, as illustrated in FIG. 4.

For example, since the RSSI is measured in the OFDM symbols #0/#4/#7/#11 in the serving cell, in FIG. 4, such RSSI certainly contains a power of the reference signal of OFDM symbols #0/#4/#7/#11 in the neighboring cell.

In this case, since the influence of the signal from the neighboring cell, which needs to essentially be excluded, is included in the calculation of the RSRQ, there is a problem that the RSRQ cannot appropriately be calculated.

For example, in FIG. 4 it is assumed that the neighboring cell transmits only the reference signal and the serving cell transmits both of the reference signal and a data signal and that the signal from the neighboring cell is ten times greater than that from the serving cell.

In this case, the value of RSRQ is calculated as follows.
RSRQ=1/(10+10+12)=1/32. Here, "1/32" is "−15 dB" when is converted into dB value.

Meanwhile, the RSRQ in which the signal from the neighboring cell is excluded is calculated as follows.
RSRQ=1/12. Here, "1/12" is "−10.8 dB" when is converted into dB value.

In this case, as a value of RSRQ, the value of RSRQ (−15 dB) is calculated to deviate by about 4 dB from the latter RSRQ (=−10.8 dB) which is a value to be originally calculated.

Like this, when the value of RSRQ is not appropriately calculated, as a result, there is a problem that the handover is not appropriately performed or the increased effect on the throughput of e-ICIC is not obtained.

SUMMARY OF THE INVENTION

Therefore, the present invention has been achieved in view of the above-described problems, and an object thereof is to provide the user equipment and the measurement method, which are capable of measuring radio quality with good accuracy.

A first characteristic of the present invention is a user equipment configured to measure a radio quality of a serving cell and a neighboring cell, the equipment comprising: a measuring unit that is configured, with regard to a predetermined sub-frame, to measure the radio quality for all time symbols within the predetermined sub-frame and with regard to sub-frames other than the predetermined sub-frame, to measure the radio quality for time symbols containing a reference signal within the sub-frames.

A second characteristic of the present invention is a user equipment configured to measure a radio quality of a serving cell and a neighboring cell, the equipment comprising: a measuring unit that is configured, with regard to a predetermined sub-frame, to measure the radio quality for time symbols not containing a reference signal within the predetermined sub-frame and with regard to sub-frames other than the predetermined sub-frame, to measure the radio quality for time symbols containing the reference signal within the sub-frames.

A third characteristic of the present embodiment is a user equipment configured to measure a radio quality of a serving cell and a neighboring cell, the equipment comprising: a measuring unit that is configured to measure the radio quality when the radio quality is calculated from a received power of a reference signal of the serving cell and the neighboring cell and a total of received powers within a band, wherein the measuring unit calculates the total of received powers within the band such that the received power of the reference signal of the neighboring cell is not included in the total of received powers within the band.

A fourth characteristic of the present invention is a measurement method of measuring a radio quality of a serving cell and a neighboring cell, the method comprising: step A of determining time symbols for measuring the radio quality; and step B of measuring the radio quality for the determined time symbols, wherein the time symbols are determined depending on whether or not interference coordination is applied in the step B.

As described above, according to the present invention, it is possible to provide a user equipment and a measurement method, which are capable of measuring a radio quality with good accuracy.

DESCRIPTION OF EMBODIMENTS (Mobile Communication System According to a First Embodiment of the Present Invention)

A mobile communication system according to a first embodiment of the present invention will be described below with reference to drawings.

Figure 1:
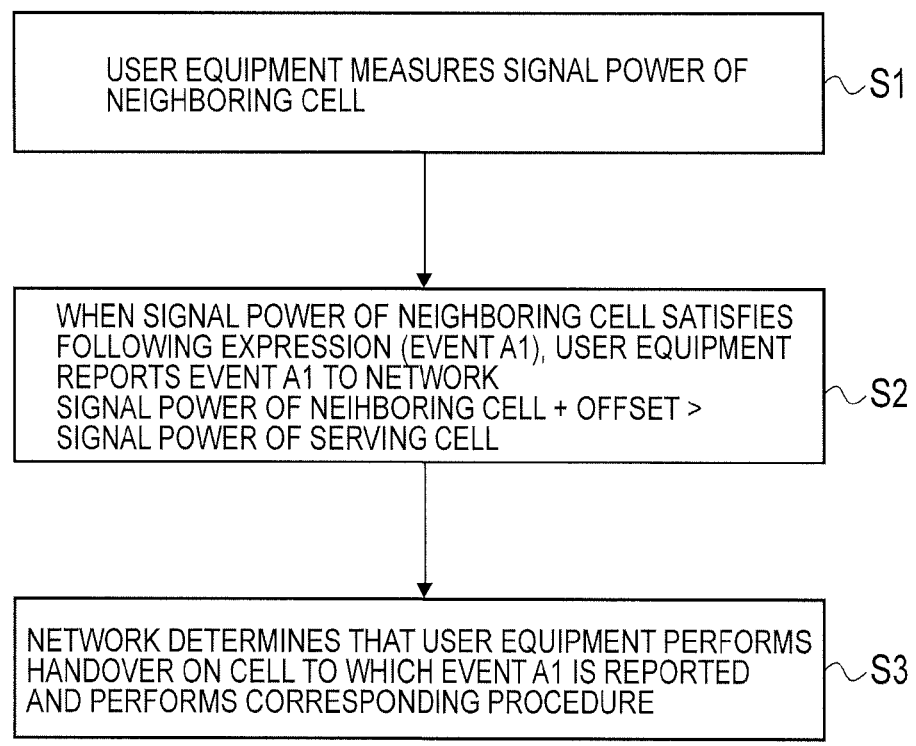
FIG. 1 is a flowchart of a handover method in a conventional mobile communication system.
Figure 2:
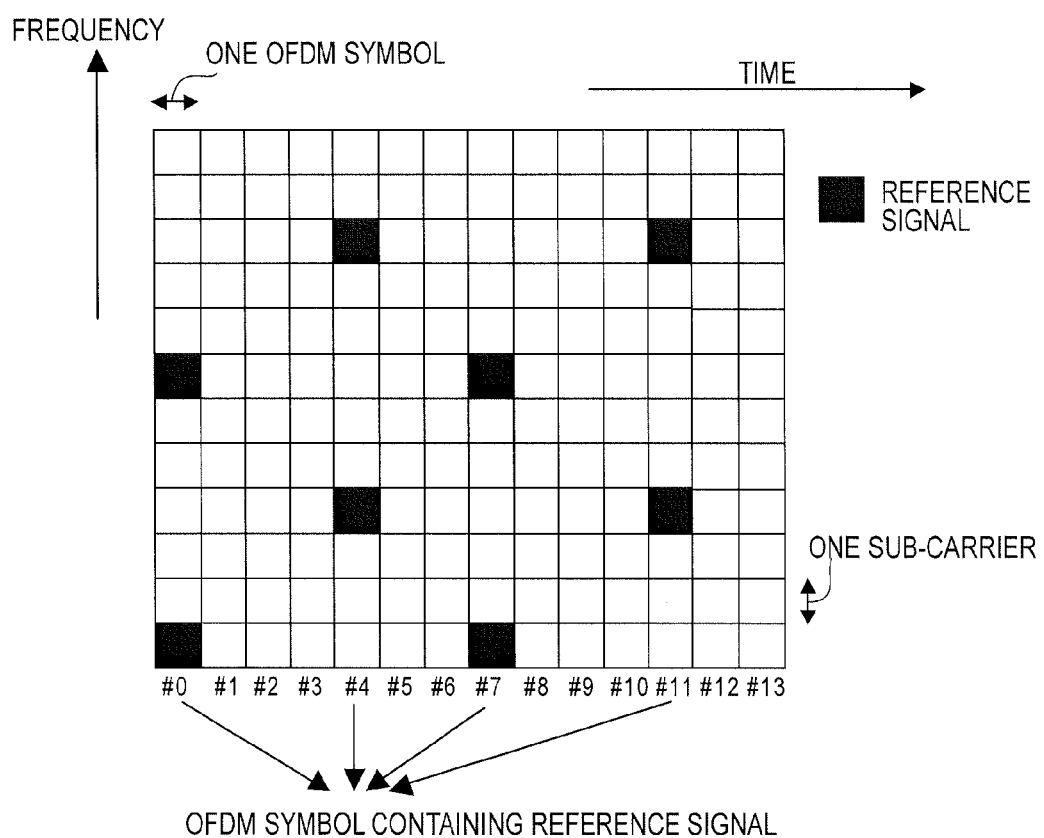
FIG. 2 is a diagram illustrating OFDM symbols for performing measurement of RSSI in the conventional mobile communication system.
Figure 3:
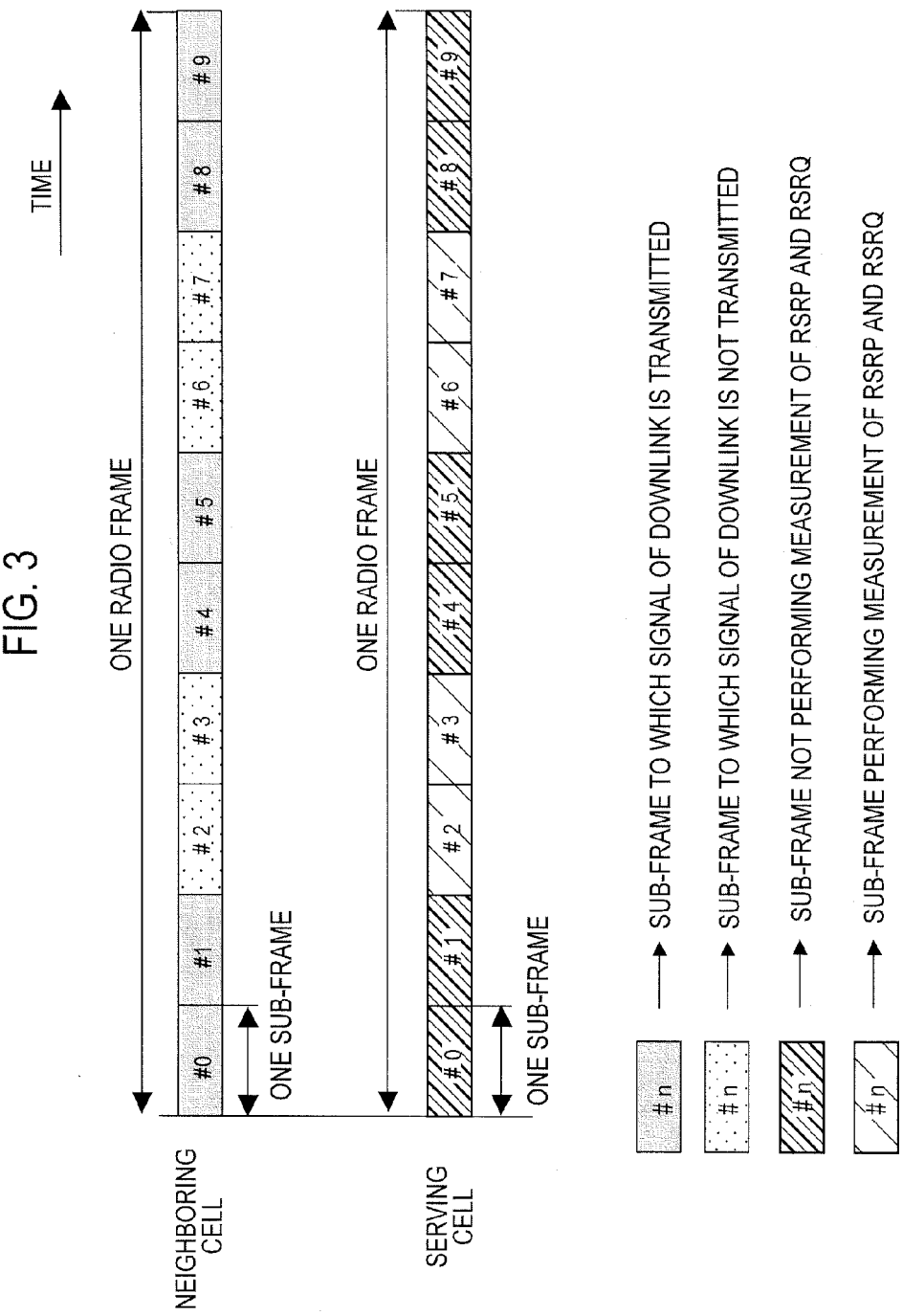
FIG. 3 is a diagram illustrating a receiving timing of RSRP and RSRQ, when interference coordination is performed between a serving cell and a neighboring cell, in the conventional mobile communication system.
Figure 4:
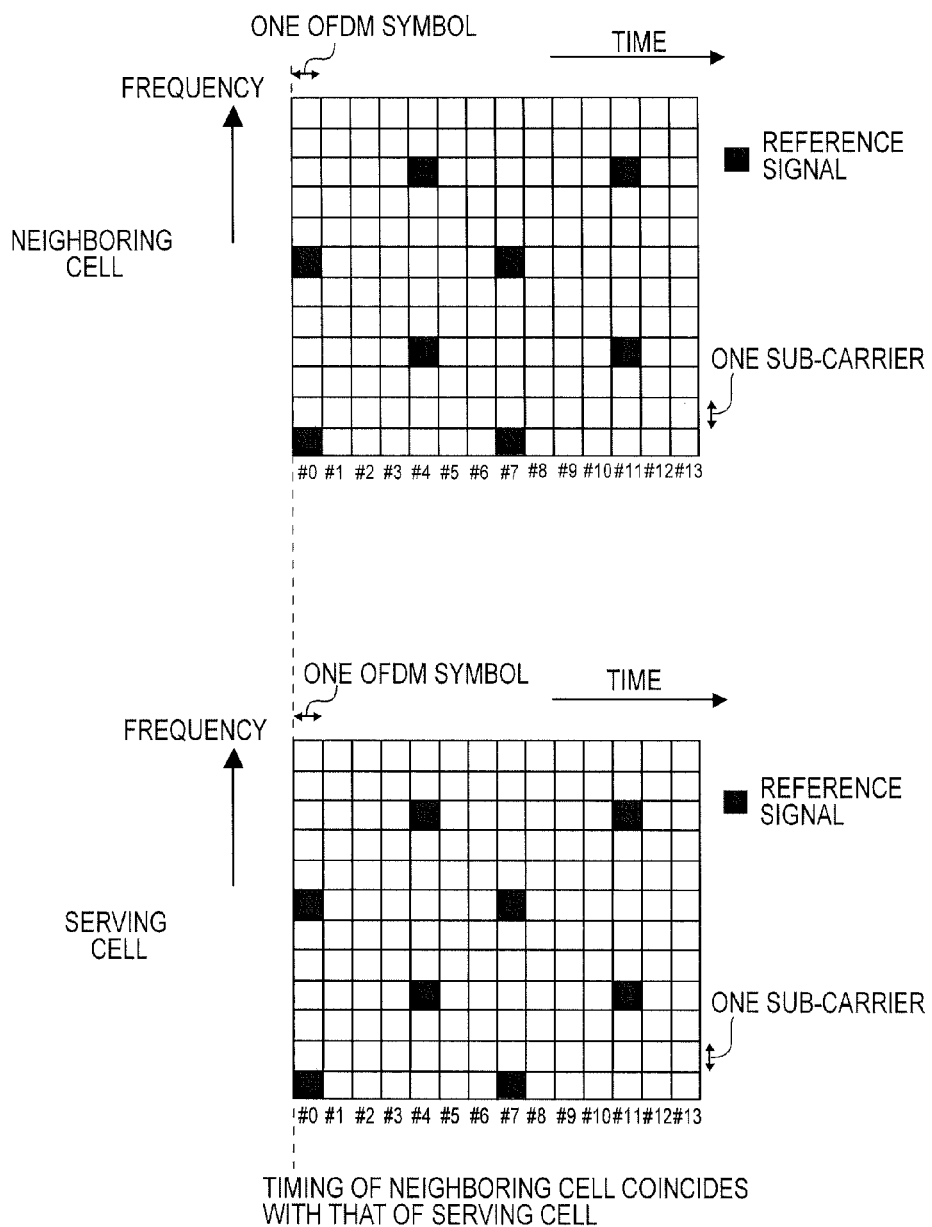
FIG. 4 is a diagram illustrating OFDM symbols for performing measurement of RSSI, when the interference coordination is performed between the serving cell and the neighboring cell, in the conventional mobile communication system.
Figure 5:
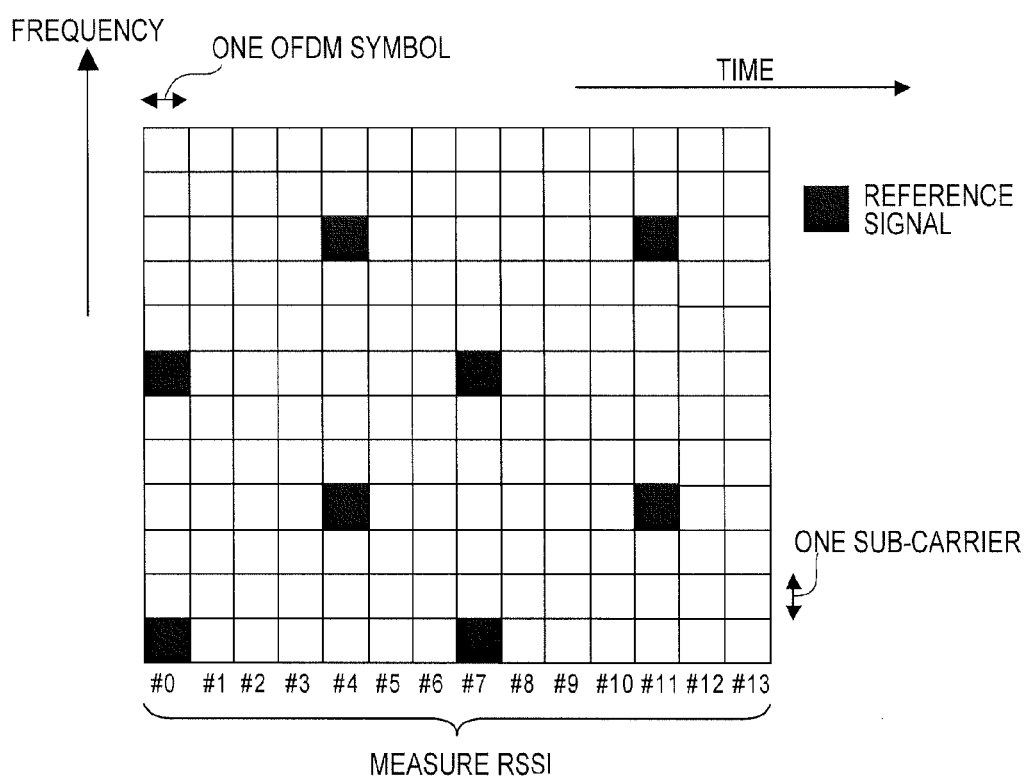
FIG. 5 is a diagram illustrating OFDM symbols for performing measurement of RSSI in a mobile communication system according to a first embodiment of the present invention.
Figure 6:
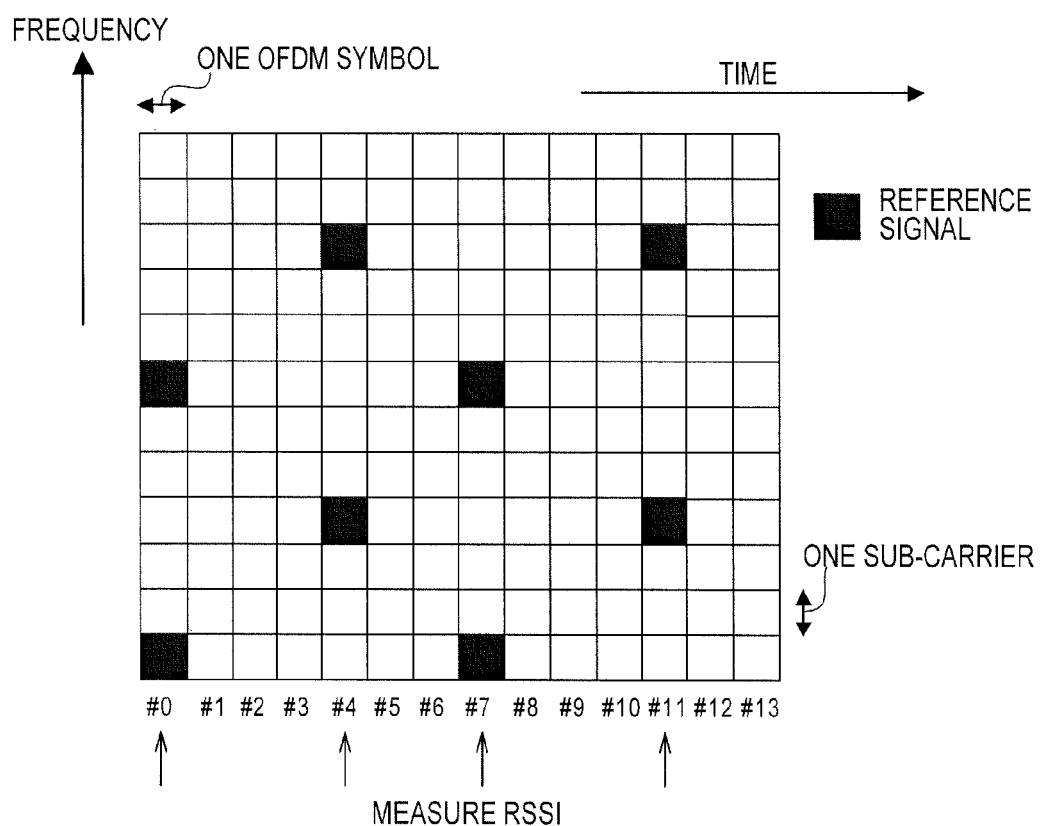
FIG. 6 is a diagram illustrating OFDM symbols for performing measurement of RSSI in the mobile communication system according to the first embodiment of the present invention.

FIGS. 5 and 6 are diagram illustrating a measurement interval of RSSI in the mobile communication system according to the present embodiment, respectively.

In the mobile communication system according to the present embodiment, in a measurement of RSRQ in a case where interference coordination is applied, RSSI of all OFDM symbols within one sub-frame is measured, as illustrated in FIG. 5, and in a measurement of RSRQ in a case where interference coordination is not applied, RSSI of OFDM symbols containing a reference signal within one sub-frame is measured, as illustrated in FIG. 6.

That is, in the measurement of RSRQ in the case where the interference coordination is applied, the RSRI of OFDM symbols #0 to #13 is measured, as illustrated in FIG. 5, and in the measurement of RSRQ in the case where the interference coordination is not applied, the RSSI of OFDM symbols #0/#4/#7/#11 is measured, as illustrated in FIG. 6.

Here, determinations of "the case where interference coordination is applied" and "the case where interference coordination is not applied" may be performed as follows.

For example, when the sub-frame, which performs the measurement of RSRP and RSRQ for the interference coordination, that is, e-ICIC, is designated by a RRC signaling, the RSSI of all OFDM symbols within one sub-frame is measured in the designated sub-frame, as illustrated in FIG. 5.

Meanwhile, when the sub-frame, which performs the measurement of RSRP and RSRQ for the interference coordination, that is, e-ICIC, is not designated by the RRC signaling, the RSSI of the OFDM symbols containing the reference signal within one sub-frame is measured, as illustrated in FIG. 6.

Here, the measurement of RSRP and RSRQ may also be referred to as "Radio Resource Management measurement (RRM measurement)".

That is, when the sub-frame for the RRM measurement in the case where the interference coordination is applied is notified by the RRC signaling, the RSSI of all OFDM symbols within one sub-frame in the sub-frame may be measured for such sub-frame for the RRM measurement, as illustrated in FIG. 5.

In this case, in all sub-frames in the case where the interference coordination is not applied or in the sub-frames other than the sub-frame for the above-described RRM measurement even though the interference coordination is applied, the RSSI of the OFDM symbols containing the reference signal within one sub-frame may be measured, as illustrated in FIG. 6.

The sub-frame for such RRM measurement may be a sub-frame for measurement of RRM and Radio link monitoring.

In addition, the sub-frame for such RRM measurement may be notified to each of the serving cell and the neighboring cell which is a measurement target.

That is, when the sub-frame for RRM measurement is notified to a certain neighboring cell, the RSSI of all OFDM symbols within one sub-frame may be measured in calculating the RSRQ of the neighboring cell, as illustrated in FIG. 5.

Alternatively, when the sub-frame for RRM measurement is notified to the serving cell, he RSSI of all OFDM symbols within one sub-frame may be measured in calculating the RSRQ of the serving cell, as illustrated in FIG. 5.

In this case, the sub-frame in which the RSSI is measured is the sub-frame for the above-described RRM measurement.

Figure 7:
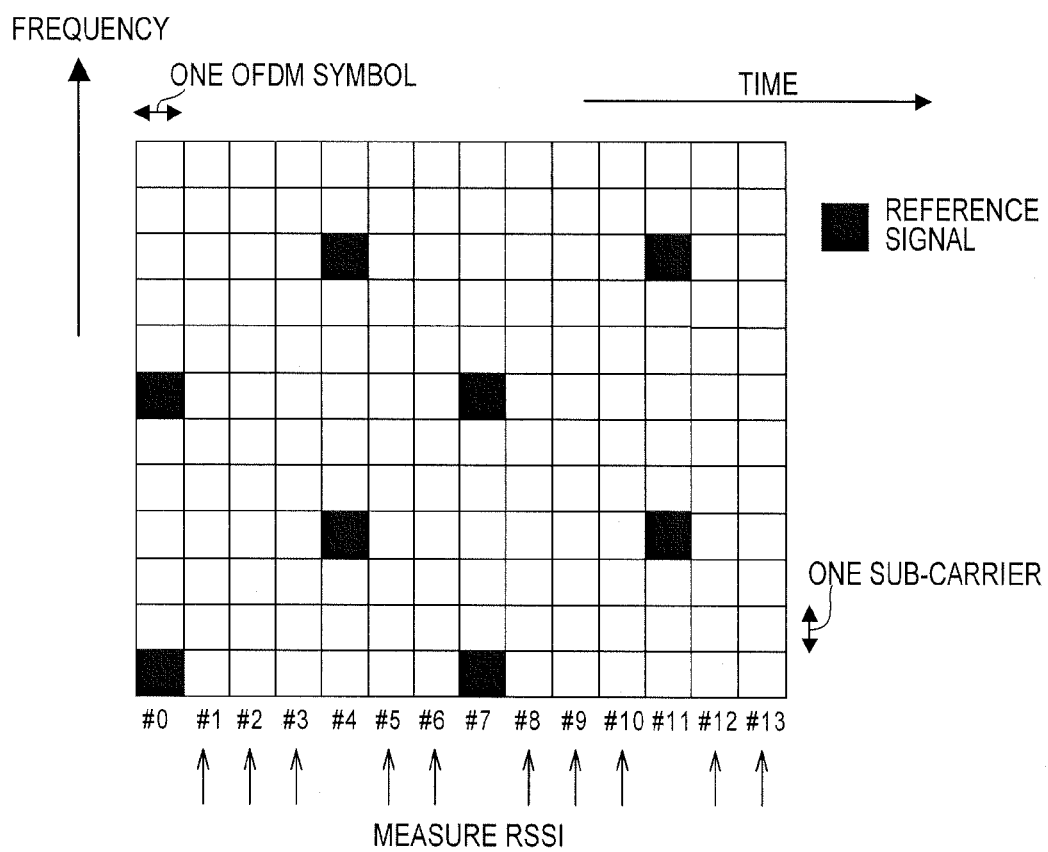
FIG. 7 is a diagram illustrating OFDM symbols for performing measurement of RSSI in the mobile communication system according to the first embodiment of the present invention.

Alternatively, the measurement illustrated in FIG. 7 may be performed instead of the measurement illustrated in FIG. 5.

That is, the RSSI of the OFDM symbol not containing the reference signal within one sub-frame may be measured in the measurement of the RSRQ in the case where the interference coordination is applied, as illustrated in FIG. 7, and the RSSI of the OFDM symbol containing the reference signal within one sub-frame may be measured in the measurement of the RSRQ in the case where the interference coordination is not applied, as illustrated in FIG. 6.

That is, in the measurement of the RSRQ in the case where the interference coordination is applied, the RSSI of the OFDM symbols #1/#2/#3/#5/#6/#8/#9/#10/#12/#13 may be measured as illustrated in FIG. 7, and in the measurement of the RSRQ in the case where the interference coordination is not applied, the RSSI of the ODFM symbols #0/#4/#7/#11 may be measured as illustrated in FIG. 6.

Figure 8:
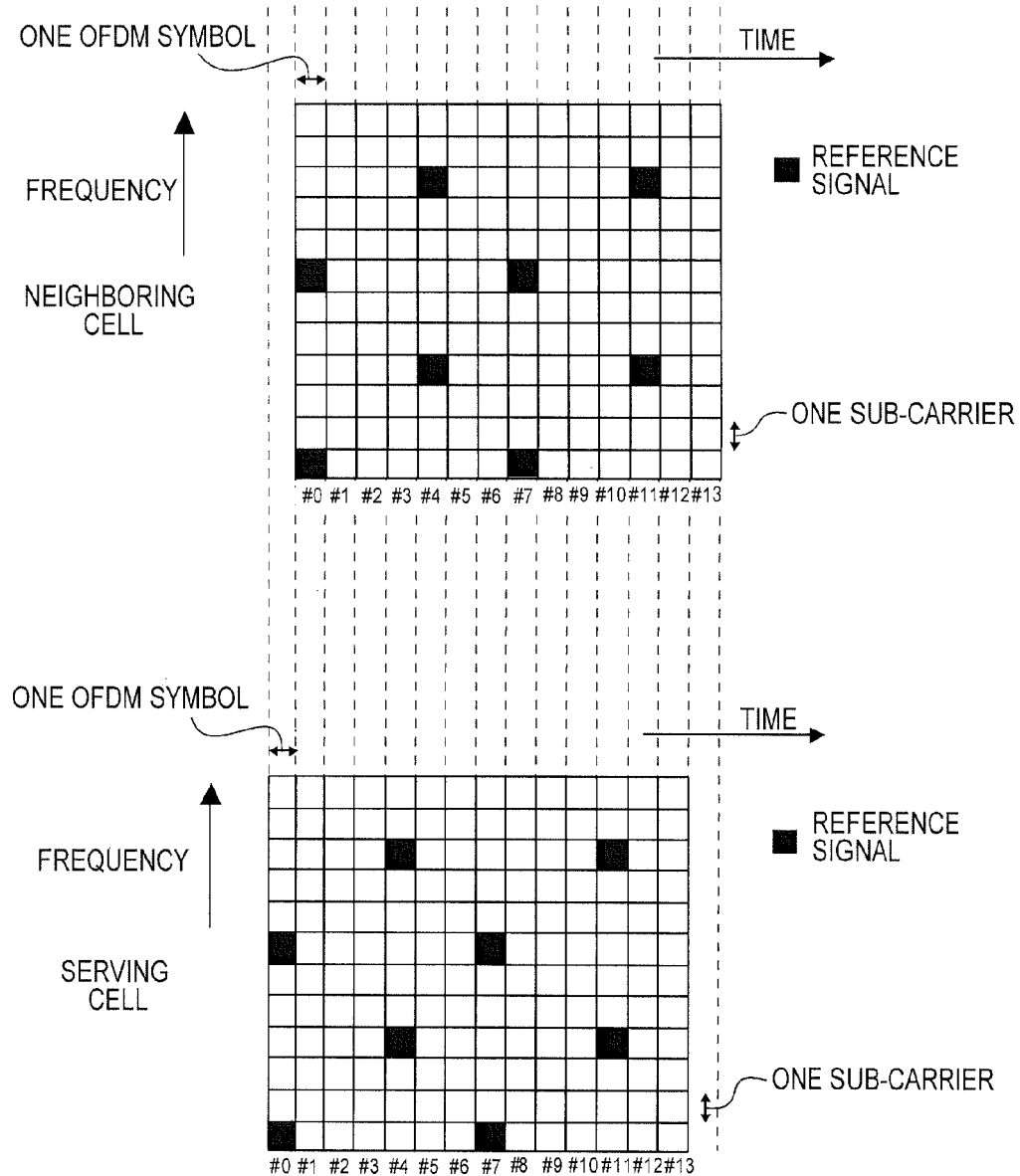
FIG. 8 is a diagram illustrating OFDM symbols for performing measurement of RSSI in the mobile communication system according to the first embodiment of the present invention.

Alternatively, the measurement illustrated in FIG. 8 may be performed instead of the measurement illustrated in FIG. 5.

That is, in the measurement of the RSRQ in the case where the interference coordination is applied, a process of not measuring the RSSI at the OFDM symbols having the same transmission timing as those to which the reference signal is transmitted in the neighboring cell and a process of measuring the RSSI at other OFDM symbols may be performed.

In FIG. 8, the OFDM symbols having the same transmission timing as those to which the reference signal is transmitted are the OFDM symbols #1/#5/#8/#12 and other OFDM symbols are the OFDM symbols #0/#2/#3/#4/#6/#7/#9/#10/#11/#13.

In addition, in the measurement of the RSRQ in the case where the interference coordination is not applied, the RSSI of the OFDM symbols containing the reference signal within one sub-frame may be measured, as illustrated in FIG. 6.

That is, in the measurement of the RSRQ in the case where the interference coordination is applied, the RSSI of the OFDM symbols #0/#2/#3/#4/#6/#7/#9/#10/#11/#13 may be measured as illustrated in FIG. 8, and in the measurement of the RSRQ in the case where the interference coordination is not applied, the RSSI of the OFDM symbols #0/#4/#7/#11 may be measured as illustrated in FIG. 6.

Note that the transmission timing of the neighboring cell may be notified by control information, broadcast information or the like of the RRC from a base station apparatus eNB. Further, the transmission timing of the neighboring cell may be notified with a unit of the OFDM symbol. Moreover, as the transmission timing of the neighboring cell, a difference of relative timing between the transmission timing of the serving cell may be notified.

Alternatively, the transmission timing of the neighboring cell may be designated by an autonomous detection of a user equipment UE.

In OFDM symbols other than the OFDM symbols having the same transmission timing as those to which the reference signal is transmitted in the neighboring cell, it is possible to appropriately measure the RSSI by measuring the RSSI at the time of applying the interference coordination.

Instead of the measurement illustrated in FIG. 5 or FIG. 7, alternatively, in the measurement of the RSRQ in the case where the interference coordination is applied, the process of measuring the RSSI of the OFDM symbols designated by the base station apparatus eNB may be performed.

That is, in the measurement of the RSRQ in the case where the interference coordination is applied, the RSSI of the OFDM symbols designated by the base station apparatus eNB may be measured, and in the measurement of the RSRQ in the case where the interference coordination is not applied, the RSSI of the OFDM symbols containing the reference signal within one sub-frame may be measured.

For example, when the OFDM symbols designated by the base station apparatus eNB is the OFDM symbols #2/#4, in the measurement of the RSRQ in the case where the interference coordination is applied, the RSSI of the OFDM symbols #2/#4 may be measured, and in the measurement of the RSRQ in the case where the interference coordination is not applied, the RSSI of the ODFM symbols #0/#4/#7/#11 may be measured, as illustrated in FIG. 6.

Here, information on the OFDM symbols designated by the base station apparatus eNB may be notified by the RRC signaling. Further, as information on the OFDM symbols, OFDM symbols used in the measurement of the RSSI may be designated and OFDM symbols not used in the measurement of the RSSI may be designated. Alternatively, as information on the OFDM symbols, information of any type may be designated as long as the OFDM symbols used in the measurement of the RSSI can be specified.

It is possible to measure the RSSI appropriately by measuring the RSSI using the OFDM symbols designated by the base station apparatus eNB.

Note that the measurement of the above-described RSRQ and RSSI may be performed as the measurement the RSRQ and RSSI of the serving cell and as the measurement the RSRQ and RSSI of the neighboring cell.

Further, the above-described example indicates the measurement method for the measurement of the RSRQ of the serving cell and the neighboring cell when a user equipment 10 is in a connected state with a network (base station apparatus), that is, in a case where the user equipment 10 is in a RRC-connected state, but may be applied in the measurement of the serving cell and the neighboring cell in a case where the user equipment 10 is in an Idle state.

Note that, when the user equipment 10 is in the Idle state, for example, the measurement of the neighboring cell is performed for the purpose of cell reselection.

<Configuration of User Equipment 10>

Figure 9:
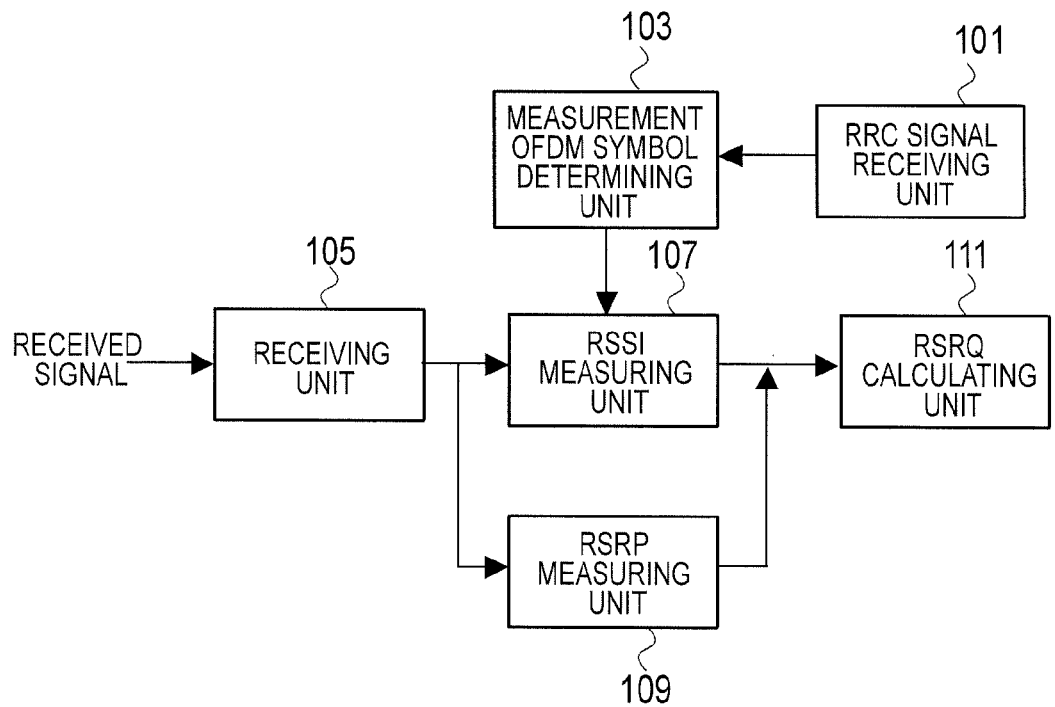
FIG. 9 is a functional block diagram of a user equipment according to the first embodiment of the present invention.

FIG. 9 is a functional block diagram of the user equipment 10 according to the present embodiment. As illustrated in FIG. 9, the user equipment 10 includes a RRC signal receiving unit 101, a measurement OFDM symbol determining unit 103, a receiving unit 105, a RSSI measuring unit 107, a RSRP measuring unit 109, and a RSRQ calculating unit 111.

The RRC signal receiving unit 101 is configured to receive a control signal of a RRC layer from the base station apparatus eNB.

For example, the RRC signal receiving unit 101 is configured to receive information on whether or not the interference coordination, that is, e-ICIC is applied to the cell as the control signal of the RRC layer.

Alternatively, the RRC signal receiving unit 101 is configured to receive information on the sub-frame for the measurement of RSRP or RSRQ in the interference coordination, that is, e-ICIC, as the control signal of the RRC layer.

The information notified by the control signal of the above-described RRC layer, for example, the information on whether or not the interference coordination, that is, e-ICIC is applied to the cell or the information on the sub-frame for the measurement of RSRP or RSRQ in the interference coordination, that is, e-ICIC is transmitted to the measurement OFDM symbol determining unit 103.

The measurement OFDM symbol determining unit 103 is configured to determine the OFDM symbol for measuring the RSSI.

More specifically, the measurement OFDM symbol determining unit 103 may be configured to receive the information notified by the control signal of the RRC layer from the RRC signal receiving unit 101 and determine the OFDM symbol for measuring the RSSI based on the information notified by the control signal of such RRC layer.

That is, the measurement OFDM symbol determining unit 103 may be configured such that all the OFDM symbols within one sub-frame are determined to be OFDM symbols for measuring the RSSI in the measurement of the RSRQ when the interference coordination is applied, as illustrated in FIG. 5, and that the OFDM symbols containing the reference signal within one sub-frame are determined to be OFDM symbols for measuring the RSSI in the measurement of the RSRQ when the interference coordination is not applied, as illustrated in FIG. 6.

Alternatively, the measurement OFDM symbol determining unit 103 may be configured such that the OFDM symbols not containing the reference signal within one sub-frame are determined to be OFDM symbols for measuring the RSSI in the measurement of the RSRQ when the interference coordination is applied, as illustrated in FIG. 7, and that the OFDM symbols containing the reference signal within one sub-frame are determined to be OFDM symbols for measuring the RSSI in the measurement of the RSRQ when the interference coordination is not applied.

The measurement OFDM symbol determining unit 103 is configured to notify the RSSI measuring unit 107 of the OFDM symbols for measuring the determined RSSI.

The receiving unit 105 is configured to receive signals transmitted from the serving cell and the neighboring cell.

The signals received by the receiving unit 105 include the reference signals to be used in the measurement of the RSRP.

The receiving unit 105 is configured to transmit the received signals to the RSSI measuring unit 107 and the RSRP measuring unit 109.

The RSSI measuring unit 107 is configured to receive the OFDM symbols for measuring the RSSI from the measurement OFDM symbol determining unit 103 and to measure the RSSI in the OFDM symbols for measuring such RSSI.

Note that, as described above, the RSSI is the sum of the received powers of all signals such as desired signals from the serving cell, interference signals from the neighboring cell, noise signals due to thermal noise, or the like.

The RSSI measuring unit 107 is configured to transmit the measured RSSI to the RSRQ calculating unit 111.

The RSRP measuring unit 109 is configured to measure the RSRP of the serving cell and the neighboring cell and to transmit the measured RSRP of the serving cell and the neighboring cell to the RSRQ calculating unit 111.

The RSRQ calculating unit 111 is configured to receive the RSSI from the RSSI measuring unit 107 and to receive the RSRP of the serving cell and the neighboring cell from the RSRP measuring unit 109.

Thus, the RSRQ calculating unit 111 calculates the RSRQ of the serving cell and the neighboring cell based on the following Expression 3.

$$RSRQ = RSRP/RSSI \quad \text{(Expression 3)}$$

Further, the above-described example indicates the measurement method for the measurement of the RSSI and RSRQ of the serving cell and the neighboring cell when the user equipment 10 is in the connected state with the network (base station apparatus eNB), that is, in a case where the user equipment 10 is in a RRC-connected state, but may be applied in the measurement of the serving cell and the neighboring cell in a case where the user equipment 10 is in an Idle state.

Further, when the user equipment 10 is in the Idle state, for example, the measurement of the serving cell and the neighboring cell is performed for the purpose of the cell reselection.

<Flowchart of Measurement Method>

Figure 10:
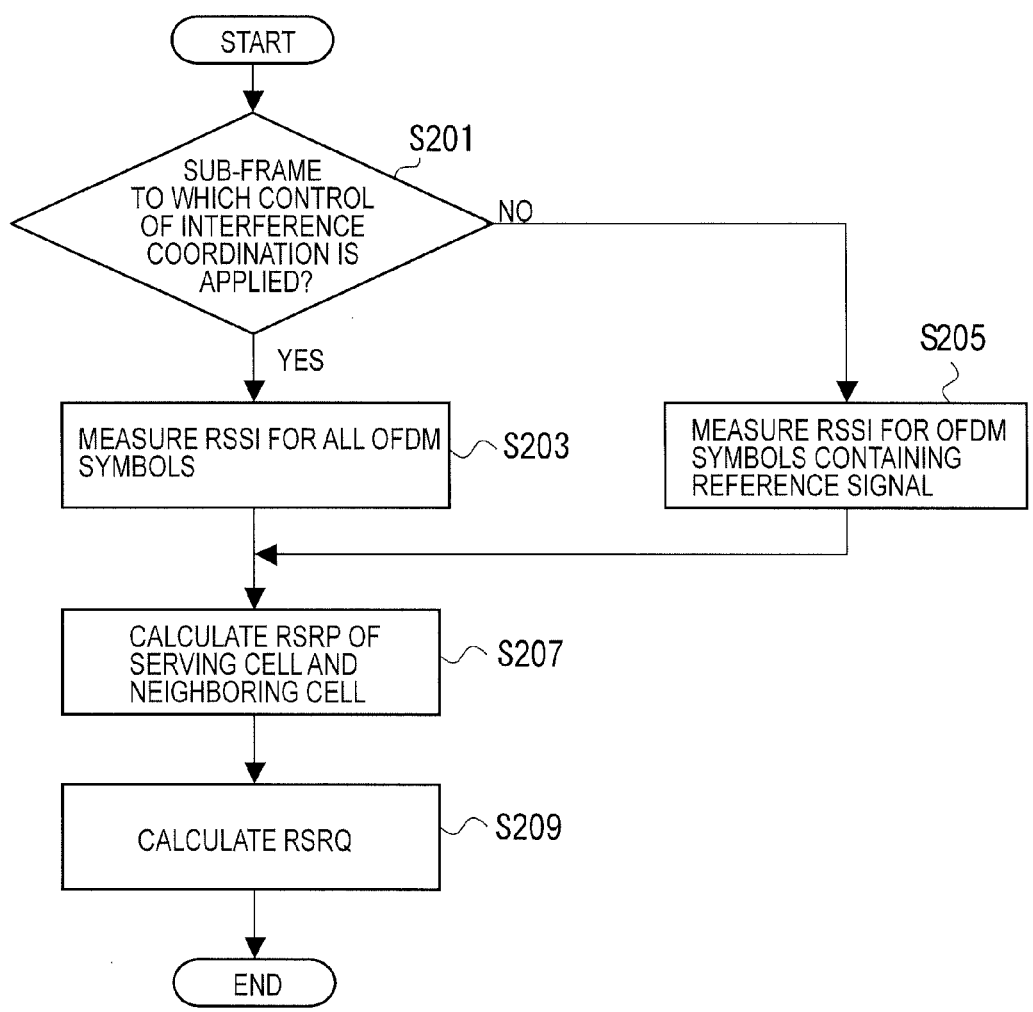
FIG. 10 is a flowchart of a measurement method in the mobile communication system according to the first embodiment of the present invention.

FIG. 10 is a flowchart of the measurement method in the mobile communication system according to the present embodiment.

In step S201, first, the user equipment 10 determines whether or not the sub-frame is the sub-frame to which the control of the interference coordination is applied.

If the sub-frame is the sub-frame to which the control of the interference coordination is applied, that is, in a case of "Yes" in step S201, the user equipment 10 measures the RSSI in all the OFDM symbols in step S203.

Meanwhile, if the sub-frame is not the sub-frame to which the control of the interference coordination is applied, that is, in a case of "NO" in step S201, the user equipment 10 measures the RSSI in the OFDM symbols containing the reference signal in step S205.

Note that the user equipment 10 may calculate the RSRQ using the RSSI calculated by the flowchart.

Next, in step S207, the user equipment 10 measures the RSRP of the serving cell and the neighboring cell.

In step S209, the user equipment 10 measures the RSRQ of the serving cell and the neighboring cell. Here, the RSRQ is calculated by a following Expression 4.

$$RSRQ = RSRP/RSSI \quad \text{(Expression 4)}$$

Note that, in the above-described S203, the user equipment 10 may measure the RSSI in the OFDM symbols not containing the reference signal, as illustrated in FIG. 7, instead of measuring the RSSI in all the OFDM symbols.

Further, the above-described example indicates the measurement method of the RSRQ of the serving cell and the neighboring cell in a case where the user equipment 10 is in the connected state with the network (base station apparatus eNB), that is, in a case where the user equipment 10 is in a RRC-connected state, but may be applied in the measurement of the RSRQ of the serving cell and the neighboring cell in a case where the user equipment 10 is in the Idle state.

Note that, when the user equipment 10 is in the Idle state, for example, the measurement of the RSRQ of the serving cell and the neighboring cell is performed for the purpose of the cell reselection.

Thus, according to the mobile communication system of the present embodiment, it is possible to measure the radio quality of the serving cell and the neighboring cell with good accuracy based on whether or not the interference coordination is performed.

More specifically, according to the mobile communication system of the present embodiment, when the interference coordination is performed, it is possible to reduce influence of the power of the reference signals from the interfering neighboring cell by measuring the RSSI in all the OFDM symbols within the sub-frame, as illustrated in FIG. 5, resulting in measuring the RSSI or the RSRQ appropriately.

In addition, according to the mobile communication system of the present embodiment, when the interference coordination is not performed, it is possible to avoid that the RSSI is close to "0" and to avoid that the value of RSRQ diverges to infinity by measuring the RSSI in the OFDM symbols containing the reference signal within the sub-frame, as illustrated in FIG. 6, resulting in measuring the RSSI or the RSRQ appropriately.

Alternatively, according to the mobile communication system of the present embodiment, when the interference coordination is performed, it is possible to exclude influence of the power of the reference signal from the interfering neighboring cell by measuring the RSSI in the OFDM symbols not containing the reference signal within the sub-frame, as illustrated in FIG. 7, resulting in measuring the RSSI or the RSRQ appropriately.

In addition, according to the mobile communication system of the present embodiment, when the interference coordination is not performed, it is possible to avoid that the RSSI is close to "0" and to avoid that the value of RSRQ diverges to infinity by measuring the RSSI in the OFDM symbols containing the reference signal within the sub-frame, as illustrated in FIG. 6, resulting in measuring the RSSI or the RSRQ appropriately.

The above-described examples indicate the example of measuring the RSSI in the OFDM symbols illustrated in FIG. 5 when the interference coordination is performed and the example of measuring the RSSI in the OFDM symbols illustrated in FIG. 6 when the interference coordination is not performed. However, alternatively, both the RSRQ calculated from the RSSI measured in the OFDM symbols illustrated in FIG. 5 and the RSRQ calculated from the RSSI measured in the OFDM symbols illustrated in FIG. 6 may be measured, when the interference coordination is performed.

In this case, when the interference coordination is not performed, only the RSRQ calculated from the RSSI measured in the OFDM symbols illustrated in FIG. 6 may be measured.

Alternatively, the above-described examples indicate the example of measuring the RSSI in the OFDM symbols illustrated in FIG. 7 when the interference coordination is performed and the example of measuring the RSSI in the OFDM symbols illustrated in FIG. 6 when the interference coordination is not performed. However, alternatively, both the RSRQ calculated from the RSSI measured in the OFDM symbols illustrated in FIG. 7 and the RSRQ calculated from the RSSI measured in the OFDM symbols illustrated in FIG. 6 may be measured, when the interference coordination is performed.

In this case, when the interference coordination is not performed, only the RSRQ calculated from the RSSI measured in the OFDM symbols illustrated in FIG. 6 may be measured.

In this case, when the interference coordination is performed, since both the RSRQ influenced by the reference signal of the neighboring cell and the RSRQ not influenced by the reference signal of the neighboring cell are calculated, it is possible to perform the measurement of the RSRQ more appropriately.

Note that the above-described both RSRQs may be notified to the base station apparatus eNB as a measurement result of the user equipment 10. Such measurement result may be referred to as a "Measurement Report".

The above-described measurement of the RSSI and the RSRQ when the interference coordination is performed may be applied depending on whether or not "MBSFN sub-frame" is set in the neighboring cell.

That is, when the "MBSFN sub-frame" is set in the neighboring cell and the interference coordination is applied, the user equipment 10 may measure the RSRQ calculated from the RSSI measured in the OFDM symbols illustrated in FIG. 5 or FIG. 7. In other cases, the user equipment 10 may measure the RSRQ calculated from the RSSI measured in the OFDM symbols illustrated in FIG. 6.

In addition, the measurement of the RSSI and the RSRQ when the above-described interference coordination is performed may be applied depending on whether or not the user equipment 10 has a function of removing the interference by the reference signal of the neighboring cell.

That is, when the user equipment 10 has the function of removing the interference by the reference signal of the neighboring cell and the interference coordination is applied, the user equipment 10 may measure the RSRQ calculated from the RSSI measured in the OFDM symbols illustrated in FIG. 5 or FIG. 7. In other cases, the user equipment 10 may measure the RSRQ calculated from the RSSI measured in the OFDM symbols illustrated in FIG. 6.

Alternatively, the measurement of the RSSI and the RSRQ when the above-described interference coordination is performed may be applied at the time of being designated from the base station apparatus eNB.

That is, when the base station apparatus eNB instructs the user equipment 10 to perform the measurement of RSSI and the RSRQ according to the present embodiment, the user equipment 10 may measure the RSRQ calculated from the RSSI measured in the OFDM symbols illustrated in FIG. 5 or FIG. 7. In other cases, the user equipment 10 may measure the RSRQ calculated from the RSSI measured in the OFDM symbols illustrated in FIG. 6.

The control may be performed as to whether or not to perform the measurement of RSSI and RSRQ to be performed depending on whether or not the above-described interference coordination is performed for each cell which is a measurement target and may be performed as to whether or not to perform the measurement of RSSI and RSRQ to be performed depending on whether or not the above-described interference coordination is performed for each sub-frame which is the measurement target.

In the above-described example, when the interference coordination is performed, the user equipment 10 selects the OFDM symbols for measuring the RSSI and measures the RSSI for the OFDM symbols so as not to be affected by the reference signal transmitted from the neighboring cell.

Instead, the user equipment 10 may measure the power of the reference signal transmitted from the neighboring cell and measure the RSSI in consideration of the reference signal transmitted from the neighboring cell.

Specifically, when representing the received power of the reference signal transmitted from the neighboring cell as "PowerNeighbor, RS", the final RSSI may be calculated as follows.

(Value of final RSSI)=(Measured value of RSSI)− PowerNeighbor,RS

That is, the user equipment 10 may calculate the RSSI so as to remove the power due to the reference signal transmitted from the neighboring cell, when the interference coordination is performed.

Specifically, the user equipment 10 may calculate the RSSI by subtracting the power by the reference signal transmitted from the neighboring cell from the measured RSSI when the interference coordination is performed.

Here, the process of calculating the RSSI so as to remove the power due to the reference signal transmitted from the neighboring cell may be performed on only the OFDM symbols affected by the reference signal transmitted from the neighboring cell.

That is, when the reference signal is transmitted from the neighboring cell at the same timing as the OFDM symbols, the process of calculating the RSSI so as to remove the power due to the reference signal transmitted from the neighboring cell may be performed. In other cases, the process of calculating the RSSI so as to remove the power due to the reference signal transmitted from the neighboring cell may not be performed.

Note that, though the preferred embodiments of the present invention have been described above, the present invention is not limited to these embodiments, and various changes or modifications can be made within the scope of the claims.

For example, the present invention is not limited to the LTE, but may also be applied to other mobile communication systems. In addition, the present invention is not limited to the mobile communication system in which the center frequency of each cell is identical, but may be applied to measurement of different frequencies in a case where the frequencies are different. Furthermore, the present invention may be applied to measurement of different radio access technologies (RAT) in a case where RATs of cells are different.

The characteristics of the present embodiment as described above may be expressed as follows.

A first characteristic of the present embodiment is a user equipment 10 configured to measure a radio quality of a serving cell and a neighboring cell including a RSSI measuring unit 107 that is configured, with regard to a predetermined sub-frame, to measure the radio quality of the serving cell and the neighboring cell for all OFDM symbols (time symbols) within the predetermined sub-frame and, with regard to sub-frames other than the predetermined sub-frame, to measure the radio quality of the serving cell and the neighboring cell for OFDM symbols containing a reference signal within the sub-frames.

In the first characteristic of the present embodiment, the predetermined sub-frame may be a sub-frame for measurement in a case where interference coordination is applied.

In the first characteristic of the present embodiment, the predetermined sub-frame may be notified by a RRC signaling from a base station apparatus eNB.

In the first characteristic of the present embodiment, the above-described radio quality may be a RSSI, and more specifically, the radio quality may be a RSSI using for a calculation of a RSRQ.

In the first characteristic of the present embodiment, the predetermined sub-frame may be a sub-frame for measurement of RSRP and RSRQ.

In the first characteristic of the present embodiment, the predetermined sub-frame may be a specified sub-frame for measurement of the serving cell.

In the first characteristic of the present embodiment, the predetermined sub-frame may be a specified sub-frame for measurement of the neighboring cell.

A second characteristic of the present embodiment is a user equipment 10 configured to measure a radio quality of a serving cell and a neighboring cell including a RSSI measuring unit 107 that is configured, with regard to a predetermined sub-frame, to measure the radio quality of the serving cell and the neighboring cell for OFDM symbols not containing a reference signal within the predetermined sub-frame and, with regard to sub-frames other than the predetermined sub-frame, to measure the radio quality of the serving cell and the neighboring cell for OFDM symbols containing the reference signal within the sub-frames.

A third characteristic of the present embodiment is a user equipment 10 configured to measure a radio quality of a serving cell and a neighboring cell including a RSSI measuring unit 107 that is configured to measure the radio quality of the serving cell and the neighboring cell when the radio quality of the serving cell and the neighboring cell is calculated from a received power of a reference signal of the serving cell and the neighboring cell and a total of received powers within a band, wherein the RSSI measuring unit 107 calculates the total of received powers within the band such that the received power of the reference signal of the neighboring cell is not included in the total of received powers within the band.

A fourth characteristic of the present embodiment is a measurement method of measuring a radio quality of a serving cell and a neighboring cell, the method including: step A of determining OFDM symbols for measuring the radio quality of the serving cell and the neighboring cell; and step B of measuring the radio quality of the serving cell and the neighboring cell for the determined OFDM symbols, wherein the OFDM symbols for measuring the radio quality of the serving cell and the neighboring cell are determined depending on whether or not interference coordination is applied in the step B.

Note that the operation of the above-described user equipment 10 (UE) and the base station apparatus eNB may be implemented by a hardware, by a software module executed by a processor, and by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. In addition, such storage medium may also be accumulated in the processor. Further, the storage medium and processor may be arranged in ASIC. Such ASIC may be arranged in the user equipment 10 (UE) or the base station apparatus eNB. Further, such storage medium or processor may be arranged, as a discrete component, in the user equipment 10 (UE) or the base station apparatus eNB.

Thus, the present invention has been explained in detail by using the above-described embodiments; however, it is obvious that, for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

REFERENCE SIGNS LIST 10 user equipment
101 RRC signal receiving unit
103 measurement OFDM symbol determining unit
105 receiving unit
107 RSSI measuring unit
109 RSRP measuring unit
111 RSRQ calculating unit

The invention claimed is:

1. A user equipment configured to measure a radio quality of a serving cell and a neighboring cell, the equipment comprising:
a circuitry configured to:
measure, with regard to a predetermined sub-frame for measurement designated by a base station of the serving cell, in a case where a control of inter-cell interference coordination is determined to be applied to the predetermined sub-frame, Received Signal Strength Indicator (RSSI) in all Orthogonal Frequency Division Multiplexing (OFDM) symbols within only the predetermined sub-frame, and
determine the radio quality based on the RSSI in all OFDM symbols within only the predetermined sub-frame;
measure, with regard to each of all sub-frames for measurement in a case where a control of inter-cell interference coordination is determined as not applied to any of the all sub-frames, RSSI only in OFDM symbols containing a reference signal within the respective sub-frame, and
determine the radio quality based on the RSSI only in OFDM symbols containing a reference signal within the respective sub-frame; and
transmit the radio quality to the base station of the serving cell.

2. The user equipment according to claim 1, wherein the predetermined sub-frame is notified by a RRC signaling from a base station apparatus.

3. The user equipment according to claim 1, wherein the RSSI is used for a calculation of an RSRQ.

4. A measurement method of measuring a radio quality of a serving cell and a neighboring cell, the method comprising:
measuring, with regard to a predetermined sub-frame for measurement designated by a base station of the serving cell in a case where a control of inter-cell interference coordination is determined to be applied to the predetermined sub-frame, Received Signal Strength Indicator (RSSI) in all Orthogonal Frequency Division Multiplexing (OFDM) symbols within only the predetermined sub-frame, and determining the radio quality based on the RSSI in all OFDM symbols within only the predetermined sub-frame;

measuring, with regard to each of all sub-frames for measurement in a case where a control of inter-cell interference coordination is determined as not applied to any of the all sub-frames, RSSI only in OFDM symbols containing a reference signal within the respective sub-frame, and determining the radio quality based on the RSSI only in OFDM symbols containing a reference signal within the respective sub-frame; and transmitting the radio quality to the base station of the serving cell.

5. The user equipment according to claim 1, wherein the predetermined sub-frame is a sub-frame for measurement of RSRP and RSRQ.

6. The user equipment according to claim 1, wherein the predetermined sub-frame is a specified sub-frame for measurement of the serving cell.

7. The user equipment according to claim 1, wherein the predetermined sub-frame is a specified sub-frame for measurement of the neighboring cell.

* * * * *